Nov. 25, 1924.

G. A. GOODSON 1,516,636

TIME SYSTEM

Filed Oct. 30, 1914

INVENTOR
George A. Goodson
BY
Pennie Davis + Goldsborough
ATTORNEYS

Nov. 25, 1924.

G. A. GOODSON

TIME SYSTEM

Filed Oct. 30, 1914

WITNESSES

INVENTOR
George A. Goodson
BY
Pennie Davis + Goldsborough
ATTORNEYS

Nov. 25, 1924.

G. A. GOODSON 1,516,636

TIME SYSTEM

Filed Oct. 30, 1914

WITNESSES
K. Schulz
L. Bates

INVENTOR
George A. Goodson
BY
Pennie Davis & Goldsborough
ATTORNEYS

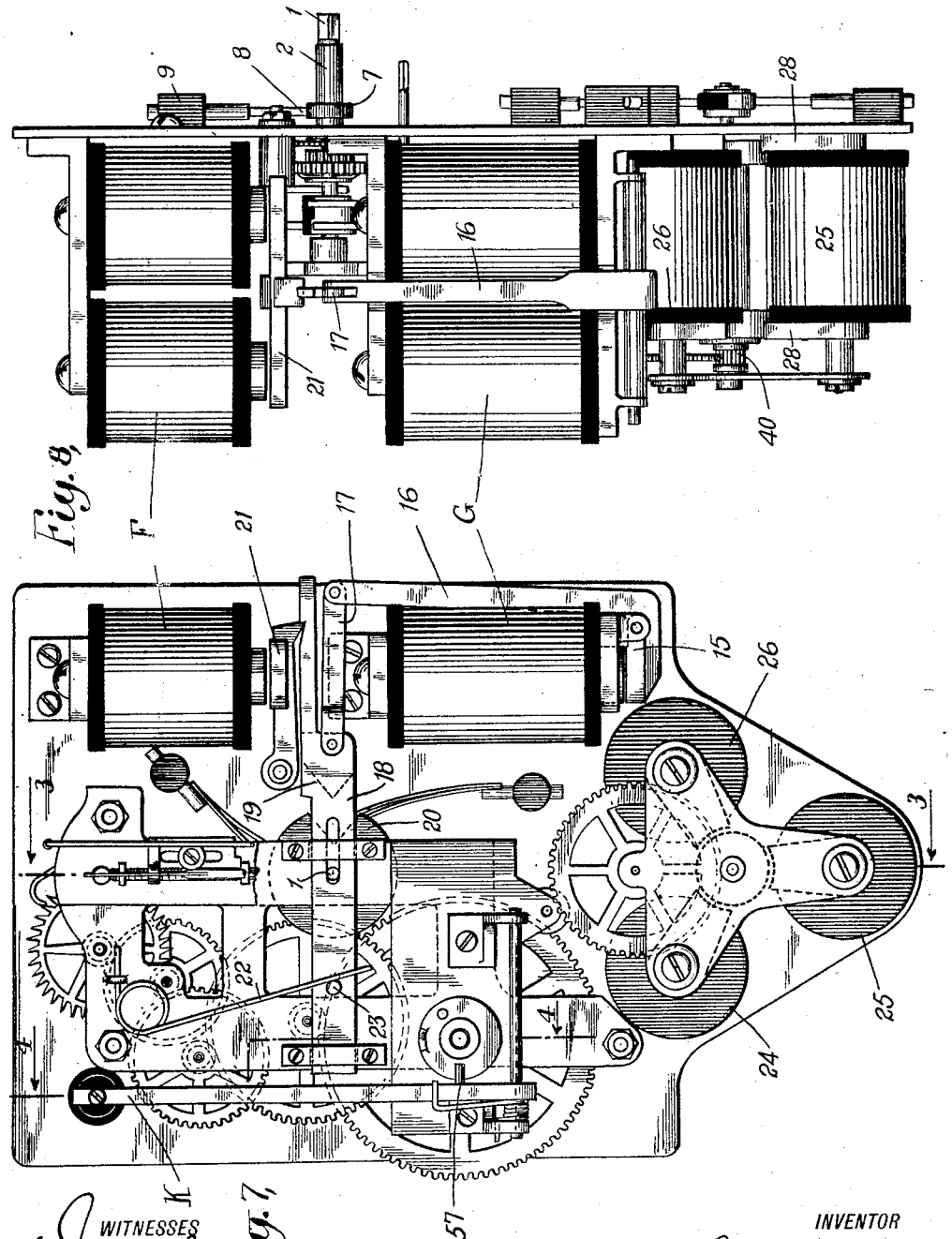

Nov. 25, 1924.

G. A. GOODSON

TIME SYSTEM

Filed Oct. 30, 1914

WITNESSES

INVENTOR
George A. Goodson
BY
Pennie Davis & Goldsborough
ATTORNEYS

Nov. 25, 1924.
G. A. GOODSON
1,516,636
TIME SYSTEM
Filed Oct. 30, 1914
6 Sheets-Sheet 6
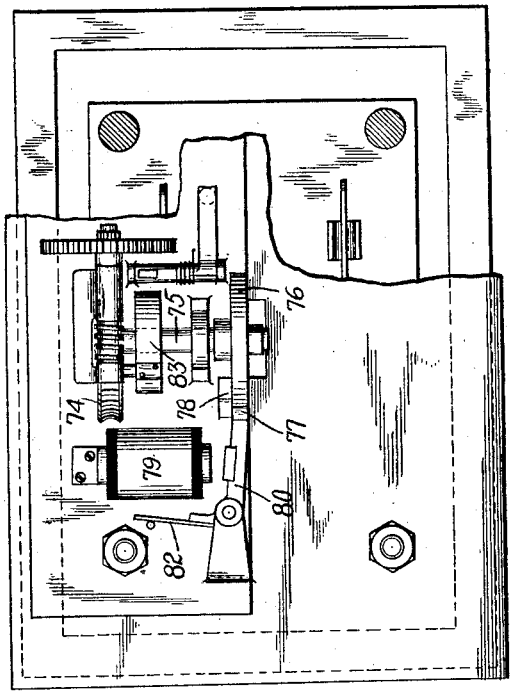
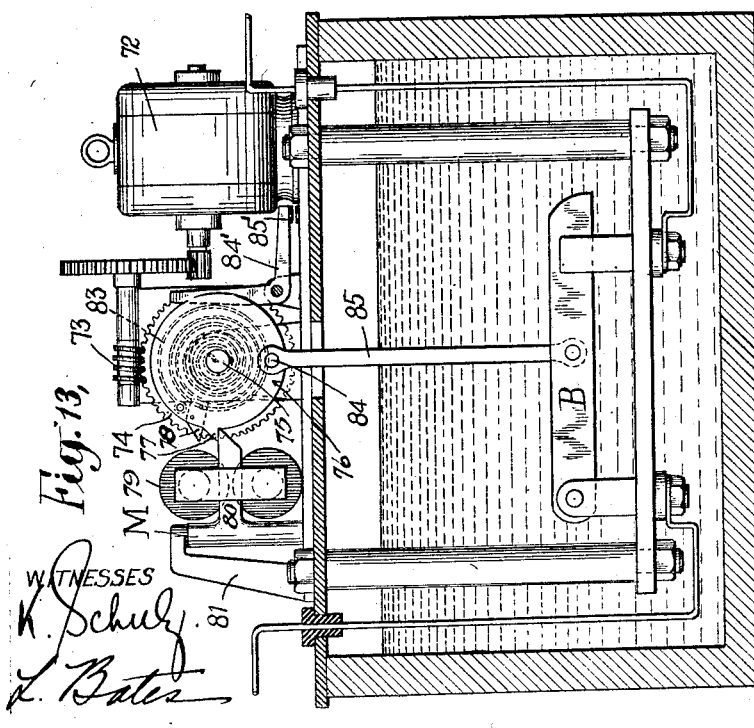
INVENTOR
George A. Goodson
BY
ATTORNEYS Patented Nov. 25, 1924.

1,516,636

UNITED STATES PATENT OFFICE.

GEORGE A. GOODSON, OF NEW YORK, N. Y.; RENA J. GOODSON ADMINISTRATRIX OF SAID GEORGE A. GOODSON, DECEASED.

TIME SYSTEM.

Application filed October 30, 1914. Serial No. 869,359.

*To all whom it may concern:*

Be it known that I, GEORGE A. GOODSON, a citizen of the Dominion of Canada, residing in the city, county, and State of New York, have invented certain new and useful Improvements in Time Systems; and I do hereby declare the following to be a full, clear, and exact description of the invention, such as will enable others skilled in the art to which it appertains to make and use the same.

The present invention relates to time systems whereby a plurality of clocks distributed throughout a building or throughout a city may be wound by the application of electrical energy from a single source or central station, and more particularly, is directed to a system whereby all of the clocks may be corrected and synchronized from the central station to compensate for slight variations in their adjustment or operation.

In accordance with the present invention, the secondary clocks may be connected at different points along a distributing system, and this system may also be used for electric lighting or power purposes. Each clock is spring-driven but has associated with the spring, an electric motor which may be brought into action periodically and automatically to wind the spring. The distributing circuit is provided with a main switch under the control of a master clock at the central station, this switch being arranged to momentarily open the distribution circuit at a predetermined instant, thereby causing a momentary cessation of current flow at the clocks, which cessation can be utilized for mechanically shifting the hands of the clocks either forward or back and into synchronism with each other and with the master clock at the power station.

It is an object of the present invention to provide at the central station, a main switch and motor-driven means for actuating the same, this means being under the control of a master clock including a tripping mechanism and a switch so arranged that periodically, say every twelve hours, the main switch will be momentarily opened, and by an actuating mechanism which is positive and powerful for both the opening and closing movements of the switch.

It is a further object of the present invention to provide a secondary clock having an associated motor of simple design arranged for operation on current from the distribution circuit, this motor being brought into action only at predetermined time intervals of but a few minutes duration, and having a circuit interrupter for stopping the motor when the clock spring has been sufficiently wound up and for preventing establishment of the circuit through the motor until the spring has unwound far enough to need a repetition of the winding.

It is another object to associate with each secondary clock of the system a synchronizing device electrically controlled and adapted on interruption of the power circuit under certain conditions to swing the hands of the clock with respect to their driving gear train, and thus correct, say once every twelve hours, for any inaccuracy in the running of the clock.

It is a further object to provide a system capable of installation on a large scale and provided with many secondary clocks which can be connected to the circuit or disconnected therefrom at will without disturbing the normal action of the system, and which will continue to operate on the system without the need for individual winding or regulation, and to do these things with reliability and by means of an equipment which throughout is of simple design and compact and inexpensive construction.

For a complete understanding of the foregoing objects and advantages, and of others which will hereinafter appear, reference is made to the following detailed description, which is to be taken in conjunction with the accompanying drawings, wherein Figure 1 is a diagrammatic representation of the system as a whole;

Fig. 7 illustrates the clock of Fig. 2 from the reverse side and shows the motor, the gear train and the electromagnets, whereby synchronizing is effected;

Fig. 8 is a side elevation of the same;

Fig. 13 is a representation, somewhat diagrammatic, of a quick break oil switch, together with a motor-driven actuating means for momentarily opening the switch;

Fig. 14 is a plan view of the same.

Figure 1:
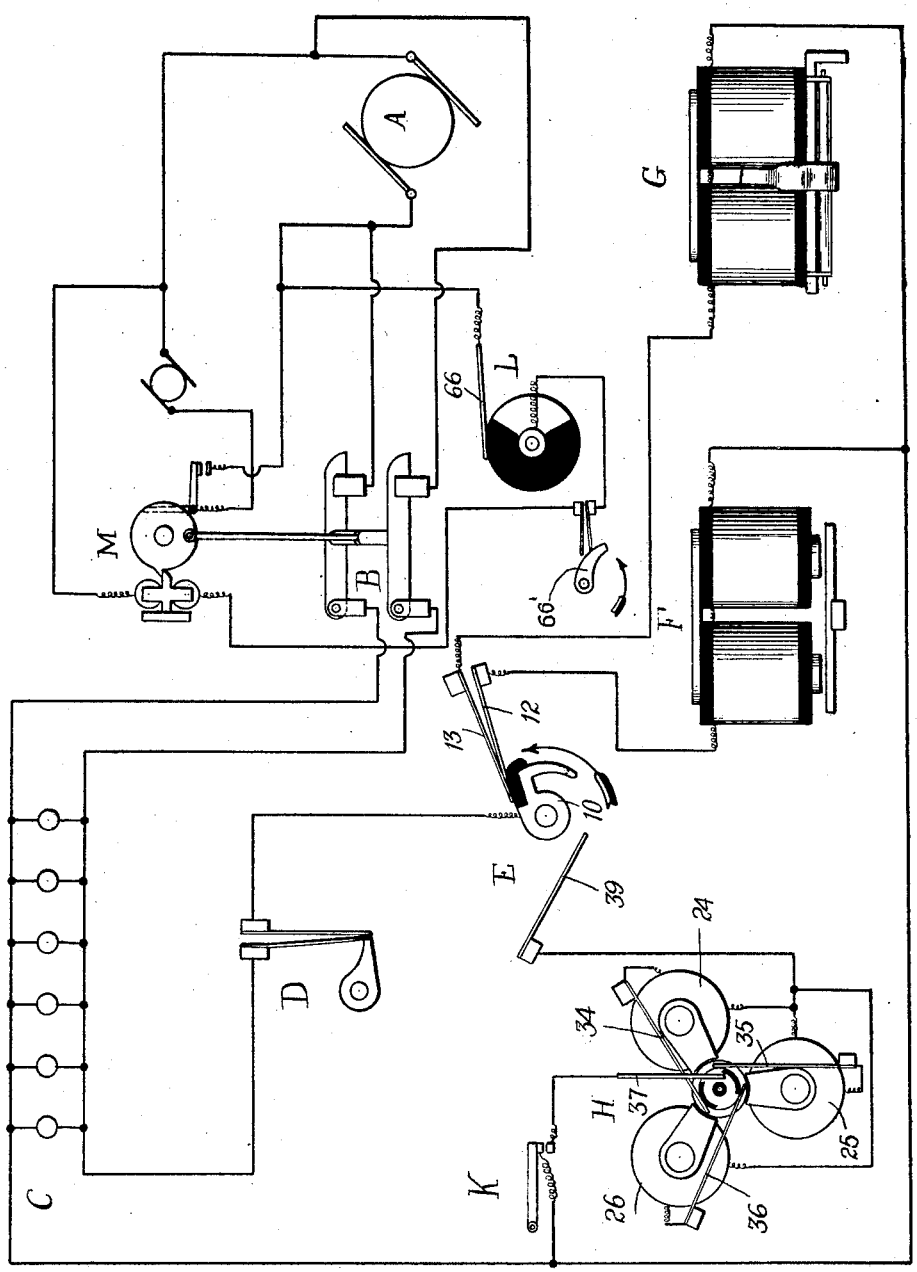

In the diagram of Fig. 1, A represents a source of power at the central station, such, for instance, as an ordinary dynamo used for supplying a lighting or other load circuit. B is the main switch whereby the flow of current from generator A to the distributing circuit may be momentarily interrupted at a predetermined instant to effect the desired synchronizing of the secondary clocks. C is the distributing circuit with its translating devices such as clocks, lights, motors and the like. One of the secondary clocks connected across this distribution circuit is indicated more in detail in Fig. 1 as including a clock switch D operated by a cam and opening the circuit to the clock except for a fractional part of each twelve hours. E is a rotating commutator associated with the minute hand of the clock and turning once every hour to establish connection between switch D and a pair of electromagnets F and G, the former of which is used to lock the synchronizing plunger against movement, and the latter of which holds that plunger against movement, releasing it, however, so that a spring may thrust the plunger forward to synchronize the secondary clock if while switches D and E are both closed the distribution circuit is interrupted by the opening of switch B.

In Fig. 1, H represents the motor used for winding the secondary clock, and K is the automatic circuit breaker for opening the circuit to the motor after the spring has been sufficiently wound up. L represents the rotary switch carried by the master clock at the central station whereby the actuating means for switch B is controlled. M is the actuating means for switch B and includes a crank disc electrically controlled by means of an electromagnet and spring operated through the action of a motor suitably connected to the source of power A.

Various details of this system will become clear by reference to succeeding figures.

The secondary clock mechanism illustrated in Figs. 2 to 9, inclusive, is in many respects like an ordinary clock, and comprises a shaft 1 for the minute hand and an arbor 2 for the hour hand with a gear train 3 therebetween, and with a gear 4 mounted on shaft 1 and frictionally connected therewith by a spring 5. It is the slipping of this gear with respect to its shaft that permits movement of the hands during synchronizing. Gear 4 is driven through the usual gear train from a gear 6 carried on the axle of the spring barrel. This clock has a usual pendulum, escapement and regulator.

Figure 2:
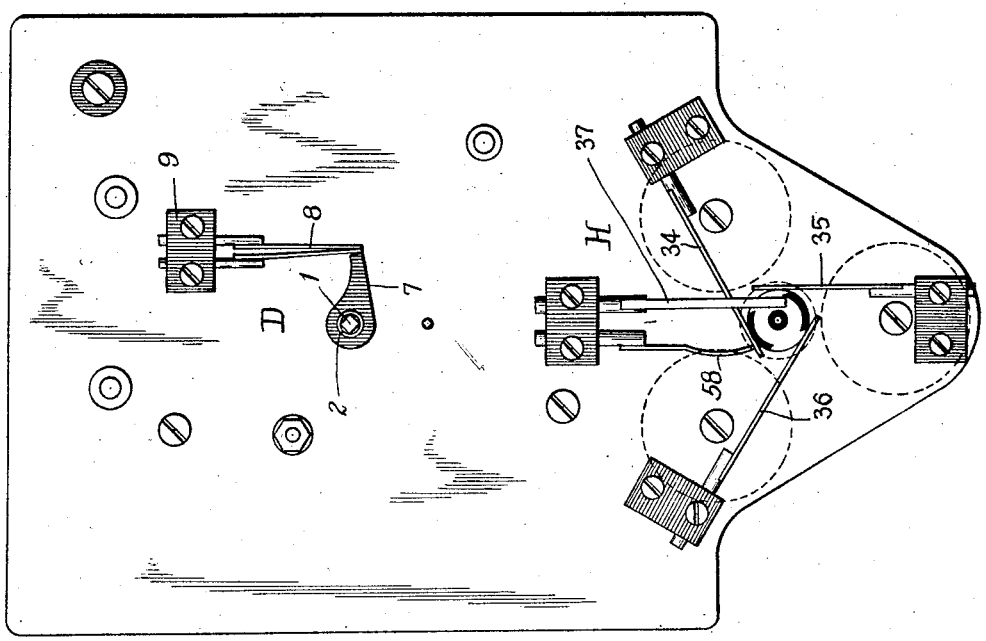
Fig. 2 is a front elevation of a secondary clock illustrating the commutator of the motor used for winding that clock, and also showing the clock switch actuated by a cam on the arbor of the hour hand.

Mounted on the arbor 2 of the hour hand, as shown in Fig. 2, is a cam 7 of fibre, movable against the spring blades 8 of a switch supported in a fibre block 9 on the front faceplate of the clock. This switch is indicated at D in the diagram (Fig. 1), and is used to establish connection between the clock circuit and the distributing circuit throughout part of an hour in every twelve. Except when switch D is closed there can be no flow of current through the circuits of the secondary clock, and any accident to the power supply or any interruption of the distributing circuit, has no effect on the running of the clock.

Figure 6:
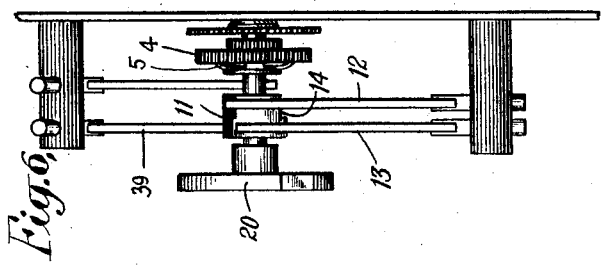
Fig. 6 is a side elevation of the same.
Figure 5:
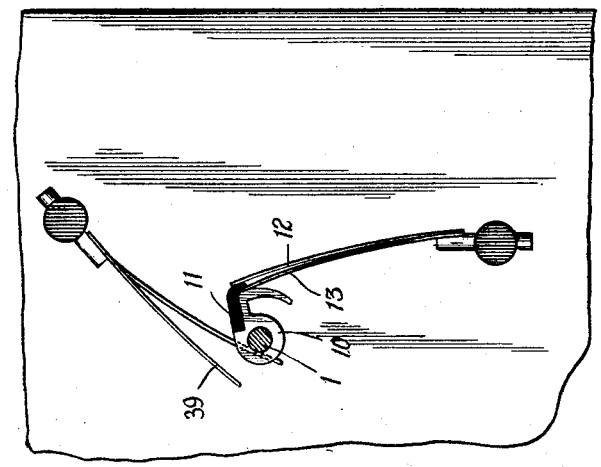
Fig. 5 is a detail of the commutator used in synchronizing the secondary clock and in establishing the circuit to the winding motor.
Figure 9:
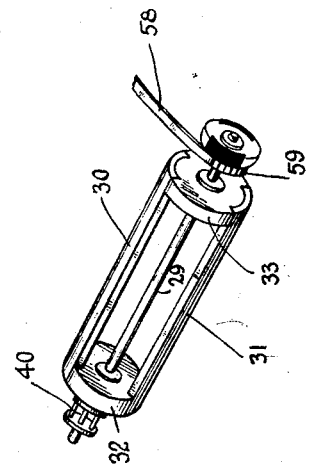
Fig. 9 is a perspective view of the motor armature showing the spring detent which prevents reverse rotation thereof when the field magnets are unenergized.

Mounted on the minute shaft 1 of the secondary clock is a commutator in the form of a segment 10 (Fig. 5), the front face of which carries a strip of insulation 11 projecting beyond the surface of the curved finger which constitutes the working periphery of the commutator. This disc 10 revolves once an hour, and with switch D closed, can pass current onward to the electromagnets F and G (Fig. 1) through yielding contact fingers 12 and 13, respectively, the latter being arranged so that it will receive current for the electromagnet G ahead of the current delivered to electromagnet F. For reasons hereinafter explained, contact finger 13 not only comes into action first, but stays in action longer than contact finger 12; and this is made possible, as illustrated in Fig. 6, by shaping the insulating strip 11 with a forward offset under finger 12 and cutting away the contact segment at 14 (Fig. 6) so that finger 12 will clear the segment while finger 13 is still in contact.

Figure 3:
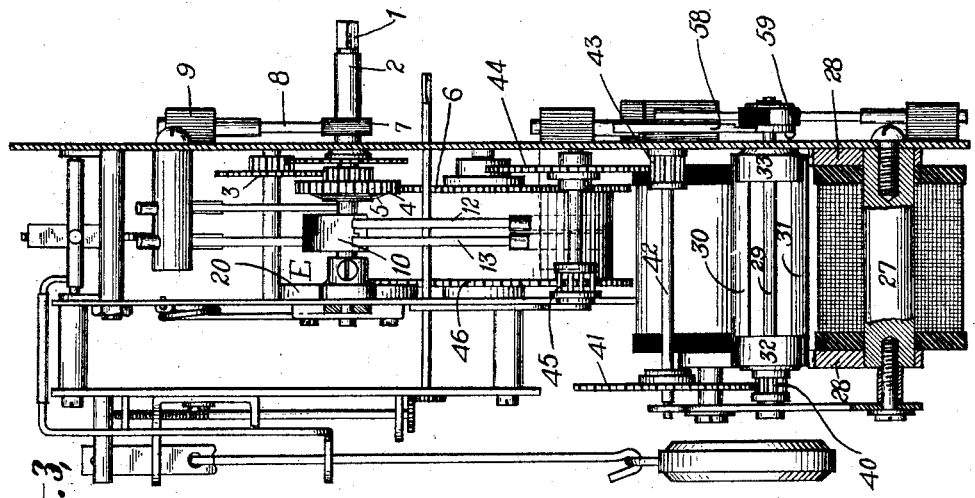
Fig. 3 is a side elevation, partly in section, of the secondary clock shown in Fig. 2.

The functions of electromagnets F and G are best illustrated by Figs. 7 and 8. The electromagnet G is provided with an armature 15 which forms one arm of a bell crank lever, the other arm 16 of which is connected through a link 17 with one end of a sliding bar 18 which carries a wedge-shaped projection 19 adapted to slide into a notch in the side of a rotating disc 20 rigidly mounted on shaft 1, as shown in Figs. 3 and 6. If the clock is running two or three minutes fast or slow, the wedge 19 will shift disc 20 forward or backward by the proper amount to make the necessary corrections. The driving gear train of the clock is not disturbed because gear 4 slips on shaft 1 because of the yielding grip of spring 5.

Electromagnet F has a pivotally mounted armature 21 with a pointed nose fitting into a notch in the extended end of bar 18 and serving as a lock for that bar under certain conditions.

By arranging commutator segment 10 and the brushes 12 and 13 as above described, electromagnet G receives the current ahead of electromagnet F, and armature 15 moves up slightly and pulls bar 18 outward just enough to release the pressure on the locking nose of armature 21. Then current is delivered to electromagnet F and unlatches the armature, and shortly thereafter, when the main circuit is interrupted, and before armature 21 has time to drop into locking position, the sliding bar 18 is forced forward by a suitable spring 22 and effects the correction by shifting disc 20. Spring 22 may be variously arranged, but is here shown as anchored to the frame of the clock and comprising an arm sliding across a projecting pin 23 in the sliding bar 18. As soon as the current comes on again at main switch B, (and this switch is never open for more than an instant,) the flow of current to electromagnet G will cause withdrawal of the sliding bar and leave disc 20 free to rotate with the minute hand, and at the same time electromagnet F will be energized and its armature held out of engagement with the sliding bar. But as commutator 10 rotates further, brush 12 drops off through notch 14, thereby de-energizing the electromagnet F and allowing its armature 21 to drop into the notch of the sliding bar. Shortly thereafter the other brush 13 breaks contact and electromagnet G is de-energized and armature 21 is relied on to hold the sliding bar against the tension of spring 22.

The angular width of the contact finger of commutator 10 may vary in accordance with particular demands, but it is convenient to have this of a width corresponding to about 8 minutes, and then by planning to open main switch B at the middle of this time interval, a clock correction amounting to 3 minutes either fast or slow can be made. Commutator 10 is of course fast on shaft 1 and is shifted in position simultaneously with disc 20 and the minute hand.

The motor used for winding this secondary clock may vary in design, but the preferred embodiment here disclosed comprises three electromagnets 24, 25 and 26 in triangular grouping, and each having an iron core 27 (Fig. 3) and pole pieces 28 at the ends of that core projecting inward toward a rotating armature, as shown in Fig. 7. This armature has no windings and is of skeleton outline with a central shaft 29 and two longitudinal strips of iron 30 and 31 diametrically disposed and supported at their ends in brass hubs 32 and 33. Each of these iron strips can serve as a return path for the magnetism of an adjacent electromagnet, and by magnetizing the electromagnets in succession, the armature is made to rotate. The circuit connections for the motor may be as shown in diagram (Fig. 1), where current after it leaves commutator E may pass to any of the three electromagnets 24, 25 or 26, and leaves those electromagnets respectively through brushes 34, 35 and 36. These brushes bear on a commutator consisting of a disc insulated from the armature shaft 29 and carrying two inserts of insulation to break connection with the brushes in succession. A fourth brush 37 bears on the end of this conductive disc and establishes connection therewith continuously. The result is that when the switches leading to the motor are closed the electromagnets are successively energized by current which passes out through the commutator by way of brush 37, and ultimately returns through switch K (Fig. 1) to the distribution circuit.

Commutator E, used for energizing electromagnets F and G, can also be used for establishing current flow to the motor, for when disc 10 (Fig. 1) swings around into contact with a spring finger 39, the connection is established and can persist for about eight minutes. It is during those eight minutes in one hour out of every twelve that the motor is called upon to wind the spring of the secondary clock.

Figure 4:
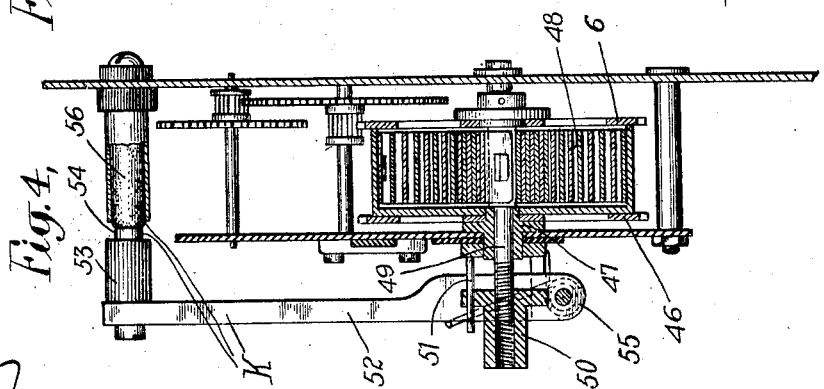
Fig. 4 is a sectional elevation through the spring drum of the secondary clock showing the current interrupter for stopping the motor after the spring has been sufficiently wound.

The mechanical connection between the motor and the clock spring may be established through a pinion 40 on the armature shaft and the gear 41 and counter-shaft 42, and additional reducing pinions and gears 43, 44 and 45. (Fig. 3). Pinion 45 meshes with a large gear wheel 46, as shown in Fig. 4, fastened to the spring barrel to which the outer end of the clock spring 48 is connected. Gear 46 and spool 47 turn with the spring barrel when the spring is being wound by the motor. Within spool 47 and free to rotate therein, is a shaft 49 on which gear 6 is rigidly mounted. One end of this shaft is provided with screw threads for actuating a nut 50, which is moved in as shaft 49 turns with unwinding of the spring, but cannot rotate with respect to spool 47 because of a guiding pin 51, along which it slides, this pin being carried by a collar mounted rigidly on an extension of spool 47. The nut 50 is used to effect opening and closing of the circuit opener K. (Fig. 1). That circuit opener, which is shown more particularly in Figs. 4 and 7, comprises a pivoted arm 52 bearing at its outer end a block of insulating material 53 in which a contact member 54 is seated. A spring 55 near the pivotal support of arm 52 tends to hold member 54 in yielding engagement with a carbon block 56 supported by the clock frame. Block 56 is electrically connected with brush 37 (Fig. 1), and contact member 54 may be permanently connected with the distribution circuit, and when 54 is in contact with 56, current may flow through the motor, and when they separate the current flow stops. As the clock spring unwinds, due to rotation of the time train, shaft 49 also rotates and thus draws nut 50 inward, allowing contacts 54 and 56 to come together under the action of spring 55. As soon as the motor starts and turns gear 46 and spool 47 to tighten the spring, it also rotates pin 51 and nut 50 about shaft 49 and causes the nut to travel outward until finally a flange on the nut strikes a pin 57 (Fig. 7) on the side of arm 52 and thus forcibly separates the contact members and interrupts the flow of current to the motor.

In order that the tension of spring 48 may not be applied backward through the gearing to rotate the motor armature backward, there is provided a spring detent 58 which bears on a collar 59 (Fig. 3) at the side of the motor commutator, and the collar is provided with a plurality of notches into which this spring detent may drop to prevent reverse rotation.

Figure 11:
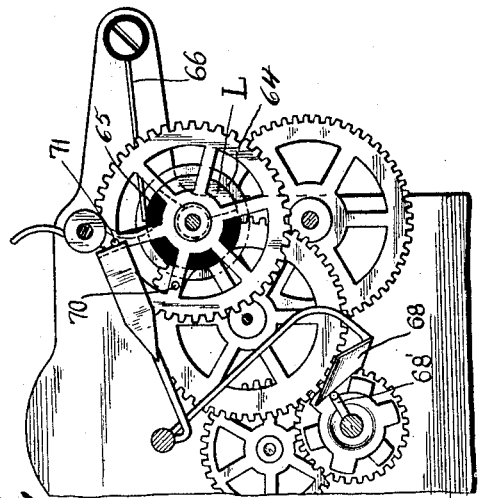
Fig. 11 shows the tripping mechanism and rotary switch whereby the main switch of the distributing circuit is controlled.
Figure 12:
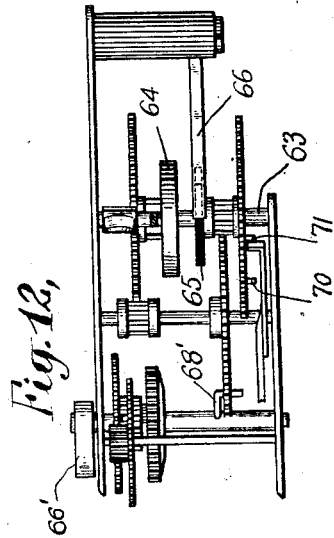
Fig. 12 is a plan view of the construction shown in Fig. 11.
Figure 10:
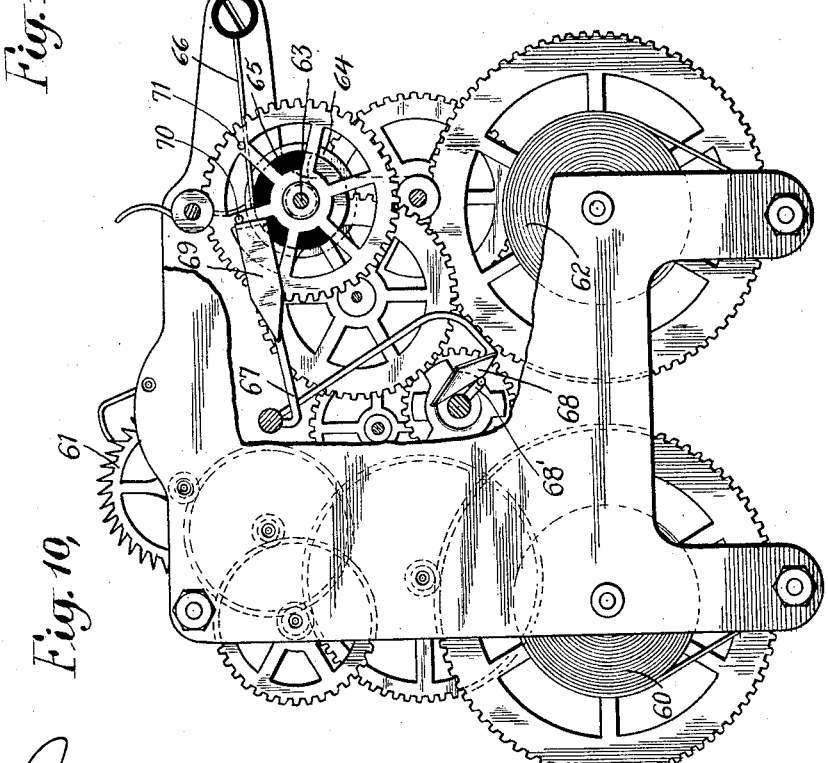
Fig. 10 illustrates the gear train of the master clock at the central station.

The master clock used at the central station for determining the instant at which switch B shall open, may be, in most of its details, of ordinary design, as illustrated in Figs. 10, 11 and 12, where 60 is the clock spring acting through a train of gearing on an escapement 61 of usual design. The clock is also provided with a second spring 62, of a type used in striking clocks, connected through a train of gears to a shaft 63 on which is mounted a small fly wheel 64 and a contact member 65, a part of which is insulating material but with a segment of metal exposed to make connection with a spring 66 which bears on the periphery of the member. As a means for releasing shaft 63 to establish a flow of current through finger 66 at the proper instant there is used an arrangement common in striking clocks, comprising a bell crank 67 having a foot 68 in the path of a pin actuated from the clock gearing and serving to rock the bell crank so that its other end 69 will first clear pin 70 and then arrest further rotation of shaft 63 by striking pin 71, but later will release that pin allowing shaft 63 to make somewhat less than one complete revolution, or, in other words, until stop 70 is arrested by the end 69 of the bell crank which meantime has dropped back to its initial lowered position. This arrangement is common in striking clocks and needs no detailed description. In Fig. 1 the reference letter L represents the segment whereby electrical connection is momentarily established with the spring finger 66.

If the actuating pin 68', used for lifting the foot 68, makes a revolution every hour, as in the case of striking clocks, there will result an hourly opening of the main switch B (Fig. 1), and while this will have no effect either on the synchronizer or on the winding motor, because of the open circuit at D, it will nevertheless produce a needless flicker at the lights and needless wear on switch B and its actuating mechanism. It is of course possible to drive pin 68' through gearing so closely associated with spring 60 that the pin will rotate once every twelve hours, but this has the disadvantage that any looseness in the gearing or any inaccuracy of adjustment, will produce irregularities in the time at which pin 71 is released and main switch B is opened. To overcome these features I have pin 68' geared for rotation once an hour, as in ordinary striking clocks, but I provide an auxiliary switch in series with the rotating segment L and brush 66 with a cam 66' mounted to rotate once in twelve hours, and arranged to permit the flow of current through brush 66 only during one hour out of every twelve. Under these circumstances, the lifting of foot 68 every hour offers no disadvantage, and results merely in a corresponding unwinding of spring 62. As a matter of mechanical construction, I may mount cam 66' on any shaft of the clock (Fig. 10) which rotates once in twelve hours, as indicated somewhat diagrammatically in Fig. 12.

It will be seen from the diagram that switch L allows current to flow momentarily through the solenoid of the switch-actuating device M. That device is shown more in detail in Figs. 13 and 14, where 72 is a motor connected through a pinion and gearing to a worm 73 for driving a worm wheel 74 loose on a shaft 75, on which is keyed a crank disc 76 bearing on its outer edge a stop 77 and carrying on its side a block 78 shaped to form a second stop at the side and somewhat behind stop 77. An electromagnet 79 is provided with a swinging armature 80 pivotally mounted in a bracket 81 (Fig. 13) and normally held away from the electromagnet by a spring 82 (Fig. 14). Encircling shaft 75 and fastened thereto is a spring 83, the outer end of which is fastened to worm wheel 74 so that when motor 72 is driven, spring 83 may be placed under tension. Crank disc 76 carries a crank pin 84 connected through a link 85 with the arm of main switch B, which may be an oil switch of any approved design.

As soon as the circuit is closed by the main clock at L (Fig. 1), electromagnet 79 will be energized and its armature 80 swung inward from its locking engagement with stop 77 and into the path of stop 78. Spring 83 will swing crank disc 76 far enough to bring stop 78 into engagement with the armature, but not enough to open switch B, and as soon as the master clock has swung the rotating segment at L out of contact with finger 66 (Fig. 1), the electromagnet 79 will become de-energized and will release its armature and the outward movement of that armature, effected by spring 82, will release stop 78 and allow disc 76 to rotate under the action of its spring 83 until stop 77 comes around into engagement with the armature. This rotation of the crank disc gives a quick make and break of the main switch B; not enough to be objectionable on a lighting circuit, but sufficient to produce the synchronizing action at the secondary clocks. This interruption is timed when clock switch D is closed and commutator E is in position to deliver current to electromagnets F and G.

As a means for controlling the operation of motor 72, I utilize an automatic switch comprising a bell crank 84' having one arm positioned to rest against the outer turn of spring 83 and bearing on its other arm a contact member 85' cooperating with a stationary contact to form a switch at which the circuit is made when spring 83 unwinds far enough to need rewinding and at which the circuit is interrupted after operation of the motor has rewound the spring and caused it to recede and permit bell crank 84' to rock away from the stationary contact.

Although the present invention has been described more particularly with reference to time indicators or clocks, it will be understood that many features are applicable to time recording clocks, time stamps, and the like.

I claim:

1. In a time system, the combination of a source of power, a distributing circuit connected therewith, a time indicator connected to said circuit and having synchronizing means controlled by a cessation of current flow in said circuit, a main switch between said distributing circuit and said source of power, and automatic means for momentarily opening said switch to synchronize said time indicator.

2. In a time system, the combination of a source of power, a distributing circuit connected therewith, a switch between said distributing circuit and said source of power, a master clock, and means controlled by said master clock for momentarily opening said switch at a predetermined instant, a secondary clock, and means for automatically connecting said clock to said distributing circuit before said main switch opens, said secondary clock having synchronizing means responsive to the cessation of current produced by opening said main switch.

3. In a time system, the combination of a source of power, a main switch, a distributing circuit supplied from said source of power through said switch, a master clock, means for actuating said main switch, said actuating means being controlled by said master clock to open said switch momentarily at a predetermined instant, a secondary clock, means for connecting said secondary clock with said distributing circuit just prior to the opening of said main switch, said secondary clock having a spring-pressed synchronizing bar and an electromagnet for holding said bar against the tension of said spring, said electromagnet releasing said bar to synchronize the secondary clock when said main switch is momentarily opened through the action of the master clock.

4. In a time system, having a source of power, a distributing circuit, a master clock, and means under the control of said master clock for momentarily interrupting the flow of current to said distributing circuit, the combination of a secondary clock driven by a spring and provided with a winding motor for said spring, said secondary clock having synchronizing means responsive to a cessation of current flow in the distributing circuit, and means operated by said secondary clock for controlling the operation of the synchronizing means and the operation of the motor which winds the clock spring.

5. In a time system, the combination of a source of power, a distributing circuit, a switch between said distributing circuit and said source of power, a secondary clock for said distributing circuit adapted for synchronizing on cessation of current in the distributing circuit, a master clock near the source of power, and actuating means for said switch comprising a spring-driven crank disc connected with said switch, and electrically controlled in its movements by said master clock.

6. In a time system, including a source of power and a distributing circuit with secondary clocks on the distributing circuit, and a switch between said source of power and said distributing circuit for synchronizing said secondary clock by a momentary cessation of current in said distributing circuit, the combination of means for actuating said switch, said means including a spring-driven element normally held against movement with an electromagnet for releasing the holding means, and a master clock for establishing a flow of current through said electromagnet at a predetermined instant to effect momentary opening of said switch.

7. In a time system, the combination of a source of power, a circuit connected therewith, a time indicator connected to said circuit, synchronizing means for said time indicator controlled by a cessation of current flow in said circuit, a master clock and means under the control of the master clock for causing cessation of current in the circuit at a predetermined instant.

8. The combination of a clock mechanism, an electromagnetically controlled setting device therefor, an electric circuit, means whereby the setting device is connected to the circuit for a brief interval of time and thereafter sets the hands of the clock when the condition of the circuit is changed, and means for disconnecting the circuit from the setting device upon the operation of the latter.

9. The combination with a clock of means for setting the same comprising a setting device, an electric lighting circuit connected thereto and supplying all of the electric energy for setting the hands and means whereby the setting device instantaneously completes the setting operation at predetermined intervals upon a temporary change in the condition of the circuit from normal.

10. The combination with a clock of means for setting the same comprising a setting device, an electric lighting circuit connected thereto and supplying all of the electric energy for setting the hands and means whereby the setting device completes the setting operation upon a temporary lowering of the voltage in said circuit.

11. The combination of a clock mechanism, a setting device therefor biased to one position and arranged to set the clock hands in moving to said position, an electric lighting circuit, and electromagnetic means connected thereto for moving said device at a predetermined time to a second position against the bias and holding it in said position until released.

12. The combination with a clock mechanism of an electromagnetic setting device therefor, a single source of electric power which supplies all the energy for controlling the setting device, and means whereby the setting device is operated to set the hands of the clock upon a temporary change occurring in the condition of said circuit during a predetermined time only as indicated by the hands of the clock.

13. The combination with a clock mechanism of an electromagnetic setting device therefor, a single source of electric power which supplies all the energy for controlling the setting device, and means whereby the setting device is operated to set the hands of the clock upon a temporary change in the condition of said circuit occurring only during a predetermined interval of time as indicated by the hands of the clock.

14. The combination with a clock mechanism of a normally energized circuit connected thereto, and means whereby the hands of the clock are set upon a temporary change in said circuit from normal occurring at predetermined intervals, without any other source of electric energy.

15. The combination with a clock mechanism, an electric lighting circuit connected thereto and means whereby the hands of the clock are automatically set upon an instantaneous change in said circuit from the normal.

16. The combination with a clock mechanism of a normally energized circuit connected thereto and normally de-energized electromagnetically controlled means whereby the hands of the clock are set upon a change in said circuit from normal without any other source of electric energy.

17. The combination with a clock, of a setting device therefor, a normally energized circuit connected thereto and supplying all of the electric energy for setting the hands and means whereby the setting device is operated upon a temporary change in the circuit occurring only at a predetermined time.

18. The combination with a clock mechanism of an electromagnetic setting device therefor, a single source of electric power supplying all the energy for controlling the setting device, and means whereby the setting device is operated to set the hands of the clock upon a temporary change occurring in the condition of said circuit during a predetermined interval of time only.

19. In a time system, a secondary clock adapted for operation on an electrical circuit, means for maintaining an open circuit to said clock throughout the greater part of the time, means for periodically closing the circuit at a predetermined time, a synchronizing bar for said clock, a spring for advancing said bar to synchronize, an electromagnet holding said bar against the tension of said spring while its current is maintained, but releasing said bar for synchronizing movement when said current is momentarily interrupted.

20. A setting device for a clock comprising a setting member movable with one of the hands of the clock, a second member adapted to advance towards and to cooperate with the setting member, means for holding the second member from advancing toward the setting member, an electric circuit including a switch and an electromagnet, means operable by the flow of the current through the electromagnet to release the holding means but to prevent the advancement of the second member, and means for withdrawing the holding means, the cessation of the flow of the current through said electromagnet, after the holding means is withdrawn, allowing the advancement of the second member to cause the shifting of the hands of the clock for setting the same.

21. A setting device for a clock comprising a commutator movable with one of the hands of the clock, a setting member movable with said commutator, a synchronizing bar positioned to advance toward the setting member and adapted to cooperate therewith to shift the hand of the clock for setting same, means normally urging said bar towards setting position, means normally holding the bar against advancement, means for withdrawing the holding means, and an electromagnet in circuit with the commutator and adapted to prevent the immediate advancement of the synchronizing bar after the holding means has been withdrawn but to permit its advancement after cessation of current flow in the circuit, and thereafter to withdraw the bar into the withdrawn position.

22. A setting device for a clock comprising a commutator movable with one of the hands of the clock, a notched disk movable with the commutator, a sliding synchronizing bar positioned to advance into the notch of the disk to shift the hand of the clock for setting same, means normally urging said bar towards setting position, means normally holding the bar against advancement, an electromagnet for withdrawing the holding means, and a second electromagnet, said second electromagnet being in circuit with the commutator and adapted to prevent the immediate advancement of the synchronizing bar after the holding means has been withdrawn but to permit the advancement of same under the driving action of said urging means after cessation of current flow in the circuit, and thereafter to withdraw the bar into withdrawn position.

23. A setting device for a clock comprising a commutator movable with one of the hands of the clock, a notched disk movable with the commutator, a sliding synchronizing bar positioned to advance into the notch of said disk to shift the hand of the clock for setting the same, a spring normally urging said bar towards setting position, a latch normally holding the bar against advancement, an electromagnet for withdrawing the latch, a second electromagnet, said second electromagnet being in circuit with the commutator, and a pivoted armature for said second electromagnet, said pivoted armature being adapted, upon the energization of the second electromagnet, to allow the latch to be withdrawn by the first electromagnet and upon a de-energization of the second electromagnet to permit the advancement of the synchronizing bar under the driving action of the spring and upon a subsequent energization of the second electromagnet to withdraw the bar to latching position.

In testimony whereof I affix my signature, in presence of two witnesses.

GEORGE A. GOODSON.

Witnesses:
M. A. BILL,
L. BATES.